United States Patent

Yu et al.

Patent Number: 5,852,414
Date of Patent: Dec. 22, 1998

[54] 4-WAY TRIANGULAR-SHAPED ALPHANUMERIC KEYBOARD

[76] Inventors: Seymour H. Yu; David H. Yu, both of 77 Oxford, Irvine, Calif. 92715

[21] Appl. No.: 368,348

[22] Filed: Jan. 4, 1995

[51] Int. Cl.⁶ .................................................. H03K 17/94
[52] U.S. Cl. ............................... 341/22; 341/20; 341/22; 200/5 A; 200/6 A; 364/709.15
[58] Field of Search .................. 341/20, 21, 22; 345/168; 200/5 A, 6 A, 6 R; 364/709.12, 709.15

[56] References Cited

U.S. PATENT DOCUMENTS

| | | | |
|---|---|---|---|
| 3,705,424 | 12/1972 | Harvey, Jr. | 341/22 |
| 3,879,618 | 4/1975 | Larson | 341/22 |
| 4,159,471 | 6/1979 | Whitaker | 345/168 |
| 4,256,931 | 3/1981 | Palisek | 200/5 A |
| 4,554,426 | 11/1985 | Caste | 200/517 |
| 4,891,777 | 1/1990 | Lapeyre | 345/168 |
| 5,124,514 | 6/1992 | Chen | 200/533 |
| 5,184,490 | 2/1993 | Takahashi | 70/277 |
| 5,199,556 | 4/1993 | Lee | 200/345 |

*Primary Examiner*—Jeffery Hofsass
*Assistant Examiner*—Ashok Mannava

[57] ABSTRACT

A triangle shape 4-way switching button for entering alphanumeric data on a 10-key pad. Each key may be used to input four characters by pressing the center of the key or one of the three corners. Each stroke enters one character, alphabet or number. Thus, an ultraminiature hand-held computer or device can be developed or manufactured.

2 Claims, 5 Drawing Sheets

1. LETTER T IS INPUT.

2. NUMERALS ARE NOT ACTIVATED, AND NUMBER 2 IS NOT BEING PRESSED.

3. ALPHABETS ARE ACTIVATED, BUT ONLY T IS BEING PRESSED TO CONDUCT CURRENT, OTHERS ARE NOT.

1. LETTER T IS INPUT.

2. NUMERALS ARE NOT ACTIVATED. AND NUMBER 2 IS NOT BEING PRESSED.

3. ALPHABETS ARE ACTIVATED. BUT ONLY T IS BEING PRESSED TO CONDUCT CURRENT, OTHERS ARE NOT.

FIGURE 5
ALPHANUMERICAL CHARACTER BUTTON ASSIGNMENT CHART

| KEY BUTTON CENTER | CORNER ALPHABET ASSIGNMENT | | |
| --- | --- | --- | --- |
| | TIP | LEFT LEG | RIGHT LEG |
| 0 | --- | --- | --- |
| 1 | A | J | S |
| 2 | K | B | T |
| 3 | C | L | U |
| 4 | D | M | V |
| 5 | N | E | W |
| 6 | F | O | X |
| 7 | G | P | Y |
| 8 | Q | H | Z |
| 9 | I | R | --- |

1. ALPHABETS ARE ASSIGNED TO NUMERICAL KEY BUTTONS, ONE PER PRESSING IN SEQUENCE.

2. IN THE FIRST ROUND, 1 TO 9 ARE FOR A TO I IN NUMERICAL ORDER.
   IN THE SECOND ROUND, 1 TO 9 ARE FOR J TO R IN NUMERICAL ORDER.
   IN THIRD ROUND, 1 TO 8 ARE FOR S TO Z IN NUMERICAL ORDER.

3. THE LOWER WEIGHT THE NUMBER DIGIT, THE LOWER THE KEY LOCATION ON 10-KEY BOARD. THE LATTER IN SEQUENCE THE ALPHABET, THE HIGHER THE KEY LOCATION ON 10-KEY BOARD.

4. THE USERS HAVE A FIXED ORDER AND LOCATION TO GO BY. THUS, THERE WILL BE LESS HESITATION AND STRESSING WHILE TYPING.

4-WAY TRIANGULAR-SHAPED ALPHANUMERIC KEYBOARD

BACKGROUND OF THE INVENTION

1. Field of Invention (Technical Field)

Currently all complex alphanumerical data must be entered through conventional big QWERTY keyboards requiring two hands and intensive memory of alphabet positions to operate. Long periods of finger practice is needed in order to achieve a reasonable level of proficiency. Most people end up with single finger typing.

2. Description of the Prior Art (Background Art)

Conventional telephone alphanumerical keypads consisting of "1"-to-"9" buttons are relevant prior art. Each button also provides one of three letters associated with a number. One of the problems associated with the conventional telephone keypad is that it cannot be used to type a specific letter. Instead, one of the three letters of a button may be used so that a "call identification" is easier to remember. Accurate data entry cannot be completed with a conventional telephone keypad.

SUMMARY

This invention provides a new way to enter full alphanumerical data into a computer or device through a 10-Key Pad. It has many advantages over the prior art:

1. One key button push gives one character, alphabet or number digit.

2. Only 10 keys are used.

3. Users are accustomed with sequences of alphabets and number digits. Therefore, there is no stress in searching for the next character in the data string.

4. A hand-held miniature computer or device can be developed by using this all-language 10-key pad.

DESCRIPTION OF THE DRAWINGS

FIG. 5. Triangle button assignment chart.

DETAILED DESCRIPTION OF PREFERRED EMBODIMENTS

This invention is for the design of a 4-way alphanumeric keyboard design. This keyboard is designed to facilitate the input of both alphabets and numerals with the use of one hand using a 10 -key style input format. Each of the (10) ten primary input keys are assigned to input up to (4) four alphanumeric characters. Input keys are shaped in the form of triangles and are activated by either 1. a one piece tilting action design or 2. a four-segment mosaic independent action design. Alphabets are mapped to the corner positions and numerals are mapped the center positions.

A. Button Shape and Character Designation

Figure 1:
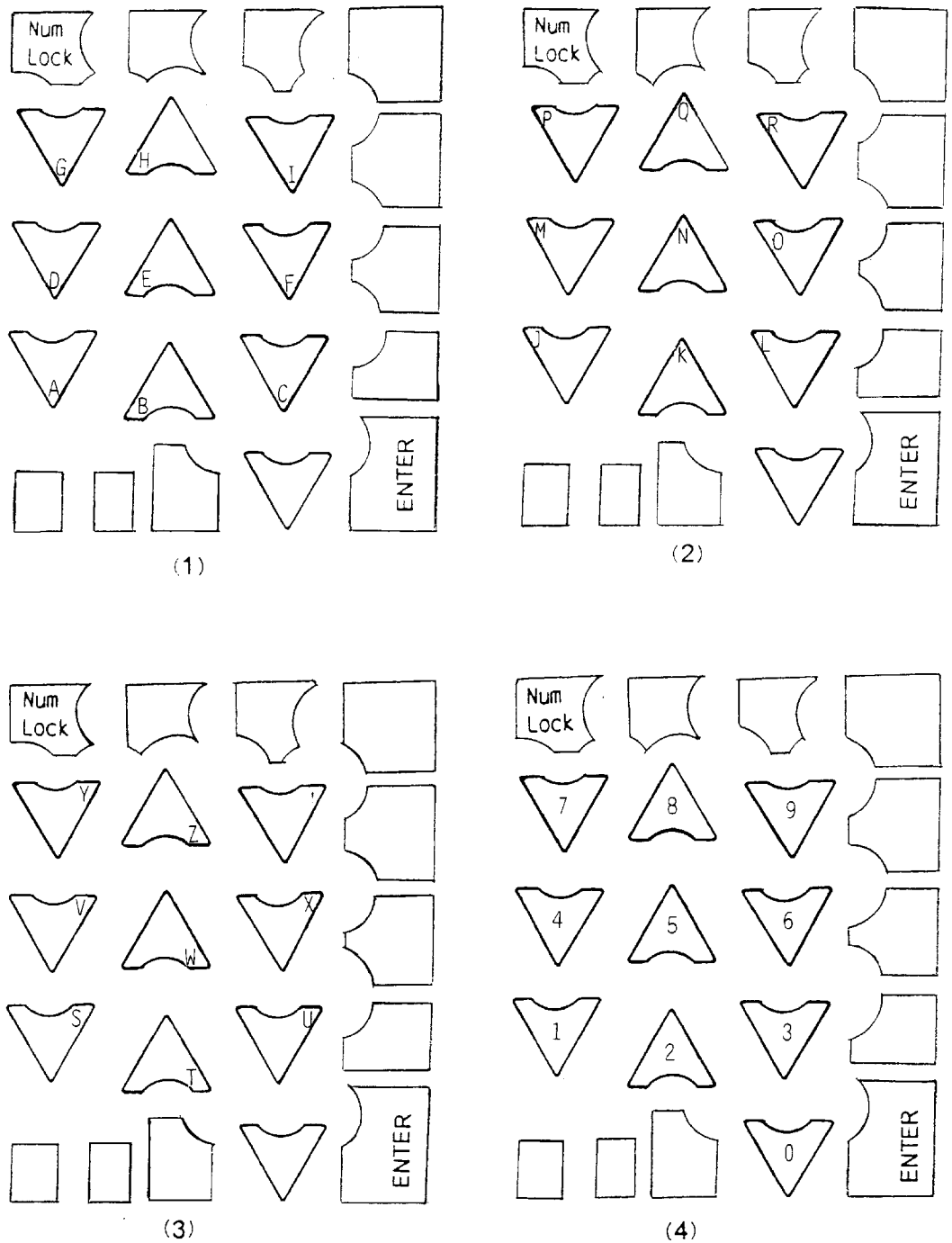
FIG. 1. 4 front views of the top surface of the key pad showing alphabets and numerals mapped in sequence by groups.
Figure 2:
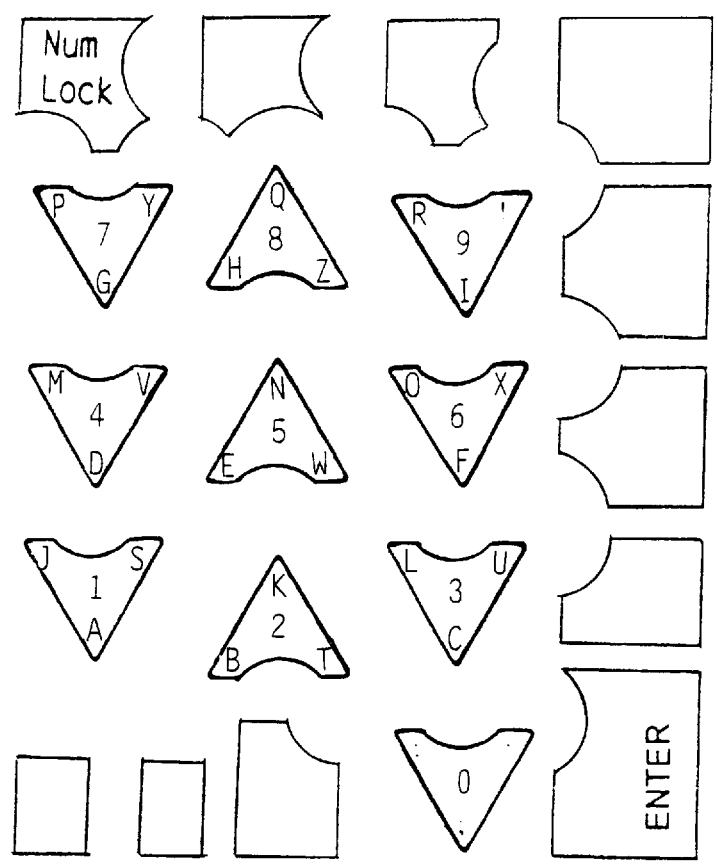
FIG. 2. A front view of the top surface of the key pad showing the new design.

The ordinary square keys are changed to triangle in shape, each triangle key has (4) four separate action points. Alphabets are designated at the corners positions and numerals are designated at the center positions. Keys are specially designed to ensure positive input of each character by correctly placing and recessing adjacent keys to prevent overlapping input. Alphanumric characters are mapped as follows, Key #1 is designated for characters (A,J,S,1), Key #2 is designated for characters (B,K,T,2), Key #3 is designated for characters (C,L,U,3), Key #4 is designated for characters (D,M,V,4), Key #5 is designated for characters (E,N,W,5), Key #6 is designated for characters (F,O,X,6), Key #7 is designated for characters (G,P,Y,7), Key #8 is designated for characters (H,Q,Z,8), Key #9 is designated for characters (I,R,9). See FIGS. 1, 2 & 5.

B. Mechanical Designs of the 4-way Triangle-shaped Input Keys

The triangle-shaped input keys are designed to function in 2 styles. 1. a one piece triangular tilting action design or 2. a four-segment mosaic independent action design.

1. One Piece Triangular Tilting Action Design

Figure 3:
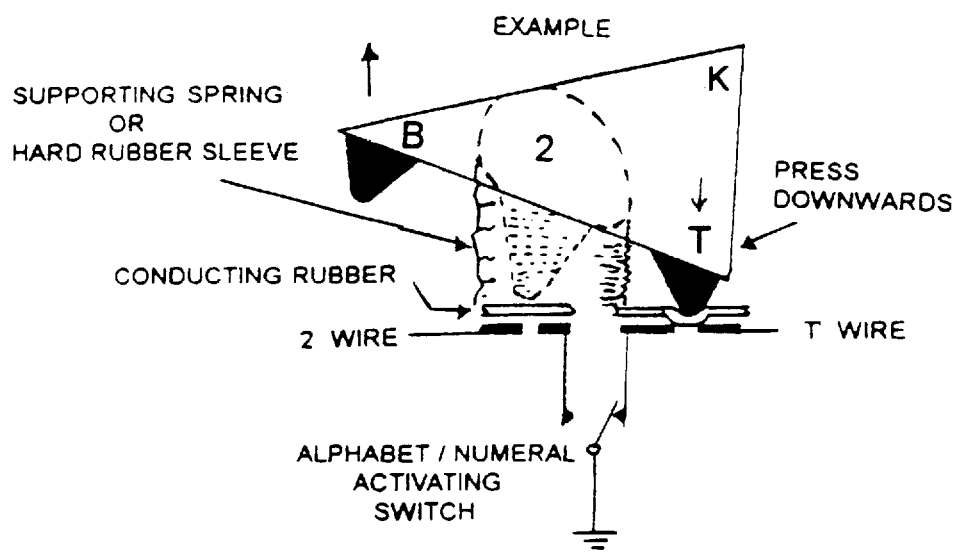
FIG. 3. One-piece triangle tilting design showing the alphabet "T" is being entered.

The one piece triangle-shaped key has (4) four legs, (3) three under each corner and (1) one longer leg under the center, the corner legs activates the alphabets while the center leg activates the numerals. Each button is supported by a hard rubber sleeve under the center portion, when downward pressure is exserted perpendicularly, the longer leg will complete the contact which in turn will activate the numerals. Alphabets are input buy applying downward force to the corners which will in turn cause the button to "tilt" thus activating the contacts for the alphabets. See FIG. 3.

2. Four-Segment Mosaic Independent Action Design

Figure 4:
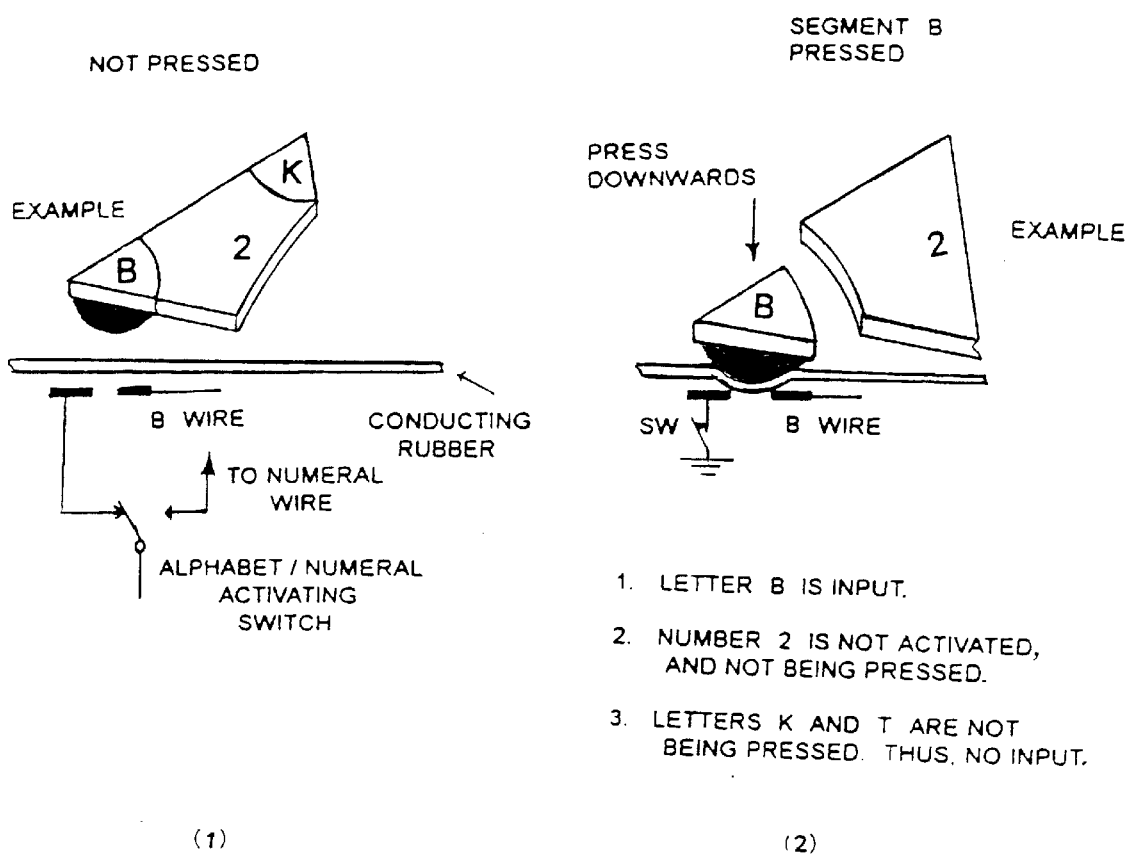
FIG. 4. A mosaic triangle key button showing the alphabet "B" is being entered.

The triangle-shaped keys are sectioned into (4) four separate segments. Each segment functions independently. The corners are mapped to activate alphabets and the centers are mapped to activate numerals. See FIG. 4. Mechanical actions and electrical contacts are the same as mentioned in FIG. 3.

Key supporting materials are made of industry standard rubber, foam, spring, and or other available materials.

We claim:

1. A triangle-shaped 4-way-switching key for a keypad consisting of 10 keys alternating upwards- and downwards-pointing positioned for entering alphanumeric data into computer or communication device, while the keys are in its first state, these 10 keys are used to enter the numbers 0 to 9 respectively, while in other three states, these 10 keys are used to enter alphabets A to Z respectively wherein each of the 10 keys has four pressing areas consisting of a first are met by the center area and the other three areas met by the corner areas, and when the first area is being pressed, the key is in said first state and the whole key sinks, when the key is in one of said other three states, one of the corners is pressed and the pressed corner tilts downwards.

2. A triangle-shaped 4-way-switching key for a keypad consisting of 10 keys alternating upwards and downwards-pointing positioned for entering alphanumeric data into a computer or communication device, while the keys are in their first state, the keys are used to enter the numbers 0–9 respectively, while in other three states, the keys are used to enter alphabets A to Z respectively wherein each of the 10 keys has four pressing areas consisting of the center area and the corner areas and when the first area is being pressed, the key is in said first state, when the key is in one of said other three states, one of the corners is pressed wherein each key is a mosaic structure consisting of four action-independent segments, each segment is an independent pressing area which sinks independently when pressed, and when a segment is pressed the key is in one of said states.

* * * * *